United States Patent [19]

Sawaide et al.

[11] Patent Number: 4,687,517

[45] Date of Patent: Aug. 18, 1987

[54] CONCRETE COMPOSITION HAVING HEAT RESISTING PROPERTY AND DIMENSIONAL STABILITY

[75] Inventors: Minoru Sawaide, Narashino; Noboru Ishikawa, Tanashi; Hideyo Shiokawa, Chiba, all of Japan

[73] Assignee: Shimizu Construction Co., Ltd., Tokyo, Japan

[21] Appl. No.: 810,866

[22] Filed: Dec. 19, 1985

[30] Foreign Application Priority Data

Dec. 25, 1984 [JP] Japan .................. 59-281800

[51] Int. Cl.$^4$ ........................................ C04B 24/36
[52] U.S. Cl. .................................. 106/96; 106/99
[58] Field of Search ............... 106/95, 89, 96, 90, 106/99

[56] References Cited

U.S. PATENT DOCUMENTS

| | | | |
|---|---|---|---|
| 2,833,620 | 5/1958 | Gier et al. ............ | 423/598 |
| 3,169,878 | 2/1965 | Snyder ................. | 106/99 |
| 4,069,870 | 1/1978 | Gallus ................. | 106/97 |
| 4,179,496 | 12/1979 | Yanagita ............. | 423/598 |

FOREIGN PATENT DOCUMENTS 58-136556  7/1983  Japan .

*Primary Examiner*—William R. Dixon, Jr.
*Assistant Examiner*—Steven Capella
*Attorney, Agent, or Firm*—Hoffmann, Dilworth, Barrese & Baron

[57] ABSTRACT

The present invention provides a concrete composition having a heat resisting property and dimensional stability, which comprises a cement selected from the group consisting of a self-hardening cement, a latent hydraulic material, a mixed cement and a thermosetting cement, a hydraulic material, an aggregate, a carbonaceous material acting as a binder and selected from the group consisting of a powdered coke and pitch coke, and potassium titanate whisker. Since the concrete composition of the invention is resistant to firing and can be used at a high temperature, a solidified mass prepared therefrom can be applied with a glaze and heated to have an enamelled surface.

6 Claims, No Drawings

CONCRETE COMPOSITION HAVING HEAT RESISTING PROPERTY AND DIMENSIONAL STABILITY

BACKGROUND OF THE INVENTION

The present invention relates to a concrete composition excellent in heat resisting property, dimensional stability and chemical stability. Particularly, it relates to a concrete composition excellent in dimensional stability and heat resisting property and adapted to be enamelled at a high temperature.

RELATED ART STATEMENT

Concrete compositions including concretes and mortars, particularly cement concrete compositions, are widely used as structural materials. However, it is known that the mechanical strength of a concrete composition having insufficient resistance to firing and heating is abruptly reduced when such a concrete is subjected to high temperature.

Many trials have been made to improve the heat resisting properties of concrete compositions, and it has been known that the heat resisting properties of concretes are remarkably improved by adding and dispersing certain carbon products in the concrete compositions.

Since concrete products have generally high water absorption coefficients, it is necessary that tiles and wall panels made of concrete should be subjected to treatment for providing them with waterproof surfaces. The disadvantages of concrete products might be eliminated and the appearance thereof might be improved, if the concrete products could be enamelled. However, in order to form a thick, dense and tough enamel coating over the surface of a concrete product, a glaze having a high melting point as of 600° to 900° C. must be used. When a conventional concrete composition is heated to such a high temperature, the cement hydrate is thermally decomposed, leading to decrease in strength of the concrete, and additionally the concrete substrate is warped or otherwise caused by dimensional change. For these reasons, it is difficult to enamel the conventional concrete composition.

OBJECTS AND SUMMARY OF THE INVENTION

A primary object of this invention is to provide a concrete composition having a high strength at normal and high temperature and being improved in chemical and dimensional stabilities.

Another object of this invention is to provide a concrete composition having a heat resisting property and dimensional stability at a high temperature, and adapted to be enamelled at a high temperature.

The concrete composition having heat resisting property and dimensional stability, provided in accordance with the present invention, comprises a cement selected from the group consisting of a self-hardening cement, a latent hydraulic cement, a mixed cement and a thermosetting cement, a hydraulic material, and aggregate, a carbonaceous material selected from the group consisting of a powdered coke and pitch coke, and potassium titanate whisker.

DETAILED DESCRIPTION OF THE INVENTION

In the concrete composition of the invention, a carbonaceous material, such as a powdered coke and pitch coke, which can form mesophase spherical particles by heating is used. The mesophase spherical particle is a kind of liquid crystal and formed as an intermediate phase in the transition course from the liquid phase to the solid phase when a heavy oil or tar pitch is thermally decomposed and carbonized. The mesophase spherical particle exhibits an optical anisotropy. It is known by the observation through a polarization microscope that the mesophase spherical particle is a single spherical product, and it is also recognized that the mesophase sperical particle has a lamella structure composed of laminated lamellae mainly composed of poly-condensation aromatic rings.

When a straight run heavy oil, thermally cracked heavy oil or tar pitch is heated to 350° to 550° C., a thermal decomposition reaction takes place to generate light oil fractions and the residue is condensated to be solidified finally. When one of the aforementioned materials is heated at a temperature within the temperature range as described above and the residue is cooled and molded together with a certain resin to obtain a molded product, the surface of which is sufficiently ground and observed through a reflection type polarization microscope, a phase showing optical anisotropic property is observed in the inspected specimen. In other words, an optically anisotropic mesophase spherical particle or area, which is liquid crystal, is observed in an optically isotropic matrix.

The crystal of the mesophase spherical particle grows as the temperature is raised or the residence time is prolonged. The mesophase spherical particle grows gradually with the increase of condensed aromatic rings in the surrounding matrix. Thereafter, the mesophase spherical particles are joined together. As one spherical particle is growing, new nuclei for spherical particles are formed. Due to interactions between these nuclei, joining of spherical bodies proceed to result in further growth of mesophase spherical particle. A powdered coke may be prepared by thermally decomposing a petroleum heavy oil at 450° to 550° C. in a reducing atmosphere to obtain a crude coke which is ground for 1 to 30 minutes.

Potassium titanate whisker is a synthetic whisker synthesized from potassium titanate ($k_2O \cdot 6TiO_2 \cdot \frac{1}{2}H_2O$) and has an appearance resembling to natural asbestos. The potassium titanate whisker has a diameter of 0.1 to 1 micron, and a length of 0.1 to 0.2 mm. The maximum tolerable temperature of this whisker is about 900° C. This whisker has an excellent dispersibility in a cement.

The concrete ingredients of the concrete composition having a heat resisting property and dimensional stability, provided in accordance with the present invention, are prepared by mixing a cement with a hydraulic material and an aggregate. Examples of usable cement include self-hardening cements, such as Portland cements, alumina cements and expansive cements; latent hydraulic cements, such as lime slag cements and Portland blast furnace cements; and mixed cements. Examples of hydraulic material, which may be used in the present invention, include hydraulic lime, volcanic ash and calcined plaster. Examples of aggregates, which may be used in the present invention, include sand, gravel and crushed stone. The concrete ingredients are solidified when mixed with water and kneaded together. The thermosetting cement mainly composed of a CaO.Al$_2$O$_3$ base hydraulic ingredient, a CaO.SiO$_2$ base hydraulic ingredient and a gypsum base ingredient has been well known by the proposal by the American Society of Cement Technology.

The powered coke and the cement is mixed in a mixing ratio such that 1 part by weight of cement is mixed with not more than 2 parts, generally 0.1 to 1 part, by weight of powdered coke. If the mixing ratio of powdered coke is less than 0.1, the heat resisting property and the dimensional stability of the concrete composition cannot be improved. The heat resisting property of the concrete composition is not further improved by adding the powdered coke in excess of 2 parts, based on 1 part of the cement, with a disadvantage that a difficulty is encountered in kneading a concrete composition containing more than 2 parts of powdered coke.

Potassium titanate whisker is used together with the powdered coke. Generally not more than 1 part by weight, preferably 0.05 to 0.5 by weight, of potassium titanate whisker is added to 1 part by weight of cement. If the amount of added potassium titanate is less than 0.05 part by weight, based on 1 part by weight of cement, the heat resisting property and the dimensional stability of the resultant concrete composition cannot be improved. On the contrary, even if more than 1 part by weight of potassium titanate whisker is added to 1 part by weight of cement, the heat resisting property and the dimensional stability of the resultant concrete composition are not improved further.

Suitable amount of pitch coke added to the thermosetting cement ranges from 5 to 20 wt. %. If the amount of pitch coke is less than 5 wt. %, the strength and the heat resisting property of the concrete composition are not improved. On the contrary, even if the amount of added pitch coke exceeds 20 wt. %, the strength and the dimensional stability of the resultant concrete composition are not further improved with an attendant disadvantage that the strength at a low temperature is reduced due to shrinkage during the cooling step. It is preferred that 2 to 15 wt. % of potassium titanate whisker is used together with the pitch coke. If the amount of potassium titanate whisker used together with the pitch coke is less than 2 wt. %, the resultant concrete composition is not improved in strength at a high temperature, heat resisting property and dimensional stability. On the contrary, even if the amount of potassium titanate whisker used together with the pitch coke is more than 15 wt. %, the advantageous effects obtained by the addition of potassium titanate whisker are not further enhanced. When an excessively large amount of potassium titanate whisker is added, it becomes extremely hard to knead the resultant concrete composition unless the water to cement ratio is greatly increased. However, increase in water to cement ratio results in reduction in strength of the resultant concrete composition.

In preparation of a concrete composition of the present invention, the carbonaceous material and the potassium titanate whisker are dispersed in a polymer dispersion and then added to a kneaded mixture of the cement and the aggregate in the dispersed condition. An air entrained agent used generally in an air entrained concrete and commonly referred to as AE agent may be added to the concrete composition of the invention. Other additives, such as a dispersant, a hardening accelerator or a retarder, may be added to the concrete composition of the invention.

The carbonaceous materials including powdered coke and pitch coke and the potassium titanate whisker used in the present invention are chemically stable to strongly alkaline substances eluated from the cement, and are easily and uniformly dispersible in the kneaded concrete composition. The concrete composition prepared in accordance with the present invention has high strengths at normal and high temperatures, has excellent performance characteristics at a high temperature, and exhibits superior dimensional and chemical stabilities.

Although it is not intended to be bound by a theory, it is considered that the strength at a high temperature is increased by the addition of powdered coke which can form mesophase spherical particles for the following reasons. Concretes are generally deteriorated by heating due to thermal decomposition of cement hydrate when no carbonaceous material is present. However, in the presence of powdered coke, mesophase spherical particles of powdered coke are formed by heating, and the thus formed mesophase particles grow and join with each other and concurrently the powdered coke particles bind with the aggregate particles to penetrate into pores or voids formed by thermal decompositon of the cement hydrate, whereby a continuous matrix phase is formed within the solidified mass. As a result, a carbon phase excellent in strength at a high temperature is formed within the solidified mass.

When a powdered coke is heated in air, the coke is gradually oxidized above about 550° C. However, the quantity of oxygen dispersed in a concrete is very small, and thus oxidation of powdered coke in the concrete is not incurred after all and reduction in strength of the concrete composition due to oxidation of powdered coke is not found.

The pitch coke is added together with the potassium titanate whisker to the concrete composition. The pitch coke forms a continuous carbon phase at a temperature of above 450° C. By the addition of the pitch coke and the potassium titanate whisker, the strength of the concrete compositon at a temperature of from 500° to 900° C. is increased. Accordingly, a thick, dense and beautiful enamel coating layer may be easily applied on the surface of the concrete composition of the invention. Particularly when the matrix concrete is made of a thermosetting cement, the molding cycle may be shortened and a concrete composition having a high strength may be molded within a short time. The added pitch coke acts as a binder to provide a high strength at a high temperature. Warping otherwise caused at a high temperature processing step is prevented by the added potassium titanate whisker, and a concrete composition having excellent dimensional stability is obtained.

The present invention will now be described more specifically be referring to Examples thereof.

EXAMPLE 1

The powdered coke used in this Example had a softening point of not lower than 430° C., and contained 88.8% of fixed carbon, 0.5% of ash, 10.7% of volatile materials and not more than 0.5% of sulfur. The particle size distribution of the powdered coke, measured by a wet process, was as follows:
less than 16 meshes: 0.4%,
16 to 60 meshes: 25.3%,
60 to 100 meshes: 22.9%, 100 to 200 meshes: 20.4%,
200 to 350 meshes: 14.7%,
more than 350 meshes: 16.3%.

It was confirmed, by the observation through a polarization microscope, that the powdered coke formed mesophase spherical particles.

The potassium titanate whisker used in the Example had a diameter of about 1 micron and a length of about 0.2 mm, which was commercially available from Du Pont under the registered Trade Mark "Tipersul".

The powdered coke and the potassium titanate whisker were admixed to the cement mortar compositions as set forth in Table 1 to prepare samples each having a dimension of 4 cm×4 cm×16 cm, in accordance with the JIS-S-5201 Method. Each sample was aged in air, and the compressive strength of the aged sample at normal temperature was measured at 20° C. and at 80% PH.

The used cement is a normal Portland cement, and the used sand is a standard sand produced at Toyoura. The sand was mixed with the cement in the mixing ratio as set forth in Table 1 by volume ratio to prepare each of the compositions. The powdered coke and the potassium titanate whisker were added in the ratios by wt. % as set forth in Table 1 for each composition. The water/cement (W/C) ratio was 65% throughout all compositions.

TABLE 1

| Run No. | Cement (part by vol.) | Sand (part by Vol.) | Powdered Coke (wt %) | Potassium Titanate Whisker (wt %) |
|---|---|---|---|---|
| 1 | 1 | 1 | 0 | 20 |
| 2 | 1 | 1.9 | 11 | 20 |
| 3 | 1 | 1.7 | 18 | 20 |
| 4 | 1 | 1.5 | 29 | 20 |
| 5 | 1 | 1 | 53 | 20 |
| 6 | 1 | 0 | 91 | 20 |

The specimens having the compositions as set forth in Table 1 were aged for 28 days, and the aged specimens were heated at 500° C. for 90 minutes in air, cooled to the room temperature and subjected to test for determining the compressive strengths thereof. The results are shown in Table 2.

TABLE 2

| | Compressive Strength (kgf/cm$^2$) | |
|---|---|---|
| No. | Average Value of Three Specimens after Aged for 28 Days | Average Value of Three Specimens After Aged for 28 Days and Heated at 500° C. for 90 minutes |
| 1 | 212 | 148 |
| 2 | 383 | 250 |
| 3 | 450 | 236 |
| 4 | 485 | 224 |
| 5 | 480 | 196 |
| 6 | 470 | 172 |

As will be seen from the results shown in Table 2, the concrete compositions according to the present invention have the strengths higher than that of the composition added singly with the powdered coke. It is considered that the increase in strength is the effect obtained by the addition of the potassium titanate whisker. The concrete compositions of the invention have sufficiently high strengths and satisfactory dimensional stabilities, and are excellent in impact strength and tolerance to slag.

EXAMPLE 2

An alumina base cement was used as a thermosetting cement in Run Nos. 1 and 2, and a Portland cement was used as a thermosetting cement in Run Nos. 3 and 4. The potassium titanate whisker and the pitch coke were added in the ratios as set forth in Table 3.

TABLE 3

| Run Nos. | Thermosetting Cement (%) | Water/Cement Ratio (%) | Pitch Coke (wt %) | Potassium Titanate Whisker (wt %) |
|---|---|---|---|---|
| 1 | Alumina Cement | 65 | 5 | 3 |
| 2 | Alumina Cement | 50 | 5 | 3 |
| 3 | Portland Cement | 65 | 10 | 3 |
| 4 | Portland Cement | 50 | 10 | 3 |

The bending strength and the compressive strength at a temperature of from 500° C. to 900° C. of each of the specimens were measured. Each specimen at that temperature was visually inspected to learn whether the specimen was cracked or not. The results were that no crack were observed in all specimens. As comparative examples, specimens made of a conventional thermosetting concrete composition each having a water to cement ratio of 65% and containing no potassium titanate whisker and no pitch coke were prepared, and the bending strengths and compressive strengths of respective specimens were measured. The results are shown in Table 4.

TABLE 4

| | Bending Strength (kg/cm$^2$) | | | | Compressive Strength (kg/cm$^2$) | | | |
|---|---|---|---|---|---|---|---|---|
| Run No. | 1 hr. | 1 day | 7 days | 28 days | 1 hr. | 1 day | 7 days | 28 days |
| 1 | 43 | 93 | 134 | 161 | 156 | 312 | 594 | 760 |
| 2 | 55 | 110 | 140 | 168 | 163 | 340 | 625 | 809 |
| 3 | — | 94 | 142 | 163 | — | 335 | 613 | 824 |
| 4 | — | 109 | 143 | 178 | — | 376 | 695 | 885 |
| Comparative Example | | | | | | | | |
| 1 | 55 | 77 | 81 | 90 | 165 | 306 | 409 | 438 |
| 2 | 48 | 52 | 75 | 85 | 161 | 185 | 340 | 371 |
| 3 | 44 | 63 | 78 | 85 | 149 | 283 | 442 | 460 |
| 4 | 42 | 57 | 74 | 83 | 113 | 254 | 420 | 450 |

As will be seen from the results shown in Table 4, the strength of the concrete compositions of the invention at a high temperature of from 500° C. to 900° C., including the bending strengths and the compressive strengths, are about 1.5 to 2.0 times as high as those of the comparative examples. The concrete compositions of the present invention are adapted to be applied with enamel coatings on the surfaces thereof.

What is claimed is:

1. A concrete composition having a heat resisting property and dimensional stability, comprising a cement selected from the group consisting of a self-hardening cement, a latent hydraulic cement and a thermosetting cement, a hydraulic material, an aggregate, a carbonaceous material selected from the group consisting of a powdered coke and a pitch coke, said carbonaceous material capable of forming mesophase spherical particles by heating and being added in a ratio range of from about 0.1:1 to about 1:1 by weight of carbonaceous material to cement, and potassium titanate whisker having a diameter of about 0.1 to 1.0 micrometer and a length of 0.1 to 0.2 mm which is added at ratio range of from about 0.05:1 to about 0.5:1 by weight of whisker to cement.

2. The concrete composition according to claim 1, wherein said cement is a Portland cement.

3. The concrete composition according to claim 1, wherein said cement is a thermosetting cement consisting of $CaOAl_2O_3$ base hydraulic material, $CaOSiO_2$ base hydraulic material and gypsum, said concrete composition contains 5 to 20 wt. % of said pitch coke and 2 to 15% of said potassium titanate whisker, based on the unit weight of said thermosetting cement.

4. The concrete composition according to claim 1 having a heat resisting property and dimensional stability, wherein said cement is Portland cement in an amount of one part by volume, and wherein there are 2 parts by volume of sand based on the one part by volume of cement, 11 to 91 wt. % of powdered coke, and 20 wt. % of potassium titanate whisker based on the weight of said cement, and wherein said composition has a water/cement ratio of 0.65.

5. A concrete composition according to claim 1 having a heat resisting property and dimensional stability, wherein said cement is an alumina cement or a mixture of an alumina cement and a Portland cement, and wherein there is contained 5 to 10 wt. % of pitch coke and 3 wt. % of potassium titanate whisker based on the weight of said cement, and wherein said composition has a water/cement ratio of 0.5 to 0.65.

6. A concrete composition having heat resisting property and dimensional stability comprising carbonaceous material and potassium titanate whiskers in a polymer dispersion added to a kneaded mixture of an aggregate, a hydraulic material, and a cement selected from the group consisting of a self-hardening cement, a latent hydraulic cement and a thermosetting cement, said carbonaceous material capable of forming mesophase sperical particles by heating and being added in a ratio range of from about 0.1:1 to about 1:1 by weight of carbonaceous material to cement, and potassium titanate whisker having a diameter of about 0.1 to 1.0 micrometer and a length of 0.1 to 0.2 mm which is added at a ratio range of from about 0.05:1 to about 0.5:1 by weight of whisker to cement.

* * * * *

UNITED STATES PATENT AND TRADEMARK OFFICE
CERTIFICATE OF CORRECTION

PATENT NO. : 4,687,517

DATED : Aug. 18, 1987

INVENTOR(S) : Sawaide et al.

It is certified that error appears in the above-identified patent and that said Letters Patent is hereby corrected as shown below:

At Column 4, Line 57

"be" should read --by--

Signed and Sealed this

Nineteenth Day of April, 1988

Attest:

DONALD J. QUIGG

*Attesting Officer*    *Commissioner of Patents and Trademarks*